(No Model.)

J. H. LANGLEY.
Anti Friction Journal Bearing.

No. 242,006. Patented May 24, 1881.

Witnesses

Inventor:
James H. Langley
By his attorney
M. Randolph

UNITED STATES PATENT OFFICE.

JAMES H. LANGLEY, OF NEW YORK, N. Y., ASSIGNOR TO THE NATIONAL ANTI-FRICTION CAR BOX COMPANY, OF SAME PLACE.

ANTI-FRICTION JOURNAL-BEARING.

SPECIFICATION forming part of Letters Patent No. 242,006, dated May 24, 1881.

Application filed September 25, 1880. (No model.)

*To all whom it may concern:*

Be it known that I, JAMES H. LANGLEY, of the city, county, and State of New York, have made certain new and useful Improvements in Anti-Friction Journal-Bearings; and I hereby declare the following to be a full and clear description of the same.

This invention relates to an improvement in that class of journal-bearings in which rolling friction is alone produced by reason of the interposition of anti-friction rollers between the journal or axle, which is to be mounted in its bearing, and the bushing or box that forms the stationary part of the bearing.

The invention consists in forming a series of circumferential grooves around the central parts of the anti-friction rollers, and interposing in these grooves and between each two contiguous rollers a spherical separator, which will prevent the contiguous sides of two adjacent rollers from contacting with each other, and thereby producing frictional resistance due to the contact of two rollers with their peripheries moving in opposite directions. The parts of the anti-friction rollers which are thus grooved and separated are inclosed between two concentric bands, which also surround concentrically the axle or journal which is to be mounted, and the adjacent faces of these retaining-bands may be grooved to coincide with the before-mentioned grooves in the anti-friction rollers, and the said spherical separators will travel between these bands as they rotate around the journal or axle, thereby being confined within their proper orbits.

Further details of the invention relate to the construction of these retaining-bands, and also the devices for assembling the parts together, the nature of which detail features of the invention will hereinafter more fully appear. These anti-friction bearings are intended to be applied to the journals of railway-cars and all other places where the reduction of friction and frictional wear is an important object.

The invention will be readily understood by reference to the accompanying drawings, of which—

Figure 1:
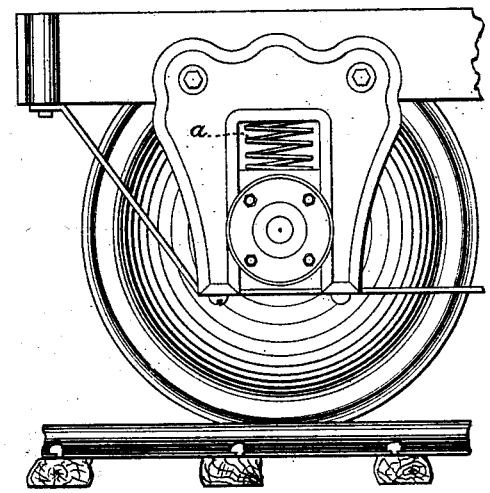
Figure 2:
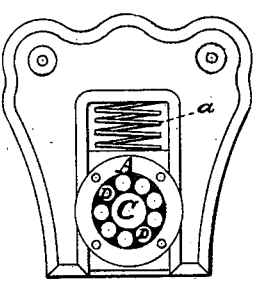
Figure 5:
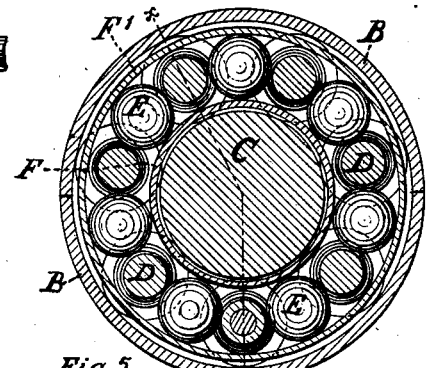
Figure 4:
Figure 3:
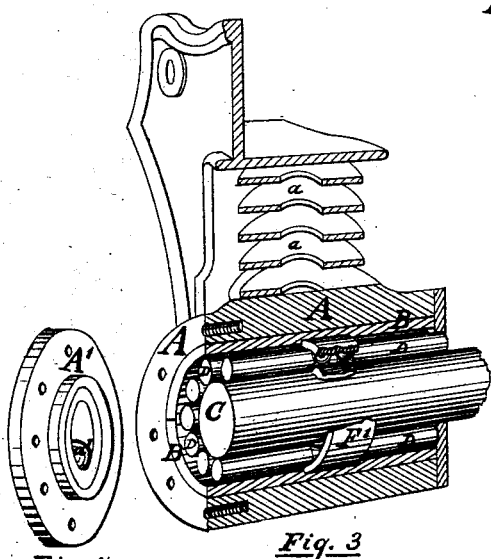
Figure 6:
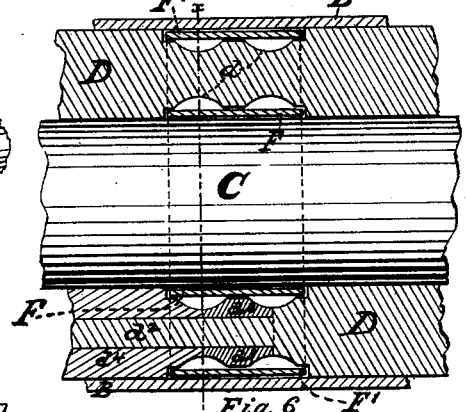
Figure 7:
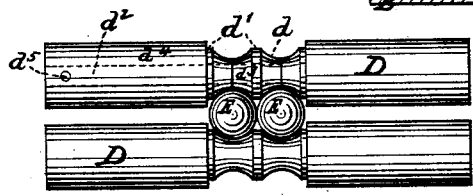

Figure 1 is a front-end elevational view of one of the improved bearings as it would appear when applied to a railway-car truck. Fig. 2 is a front-end elevation of the bearing-box with its front cap removed, so as to disclose the end of the journal, and also the surrounding anti-friction rollers. Fig. 3 is a longitudinal sectional elevation of the improved bearing, shown in perspective, so as to show the combination of the parts. Fig. 4 is a perspective view of the cap for the journal-box removed therefrom and disclosing the thrust-ball that bears against the end of the shaft. Fig. 5 is a transverse section of the journal or axle and its surrounding anti-friction rollers cut through the grooves that form the ways for the spherical separators. The location of this section is indicated by the dotted line $x\ x$ in Fig. 6. Fig. 6 is a central longitudinal sectional elevation of the bearing, showing the journal or axle in elevation, and the anti-friction rollers and retaining-bands in section. Fig. 7 is an enlarged plan of two adjacent rollers with their intervening spherical separators, and the construction of the parts so as to permit them to be assembled together.

The shell or box A of this bearing may be made in any approved or desirable form, which will, of course, vary with the object to which the bearing is to be applied, and it may or may not have a bearing spring or cushion, *a*, interposed between the bearing proper and its fixed support or load.

Within the shell or housing A there will be fitted an annular bushing, B, which will fit tightly in the shell A. The bushing B will be made of any suitable hard metal, and both it and the shell A will preferably be parted longitudinally into two sections, the more readily to get at the interior and its inclosure, though this is not essential.

The axle C, which is to be supported in and by this bearing, will be a simple cylinder, of the same or about the same length as the shell or box A, and it will be placed concentrically within the bushing B, so as to leave an annular chamber between them of sufficient size to admit the anti-friction rollers D, and the said rollers will be interposed between the said axle C and its surrounding bushing B, and will fit snugly but not tightly within the annular chamber formed by the parts B and C, and therefore the axle C will rest on the anti-friction rollers D, and as the axle C revolves on its axis, the rollers D will rotate about it in the manner well known in all similar applications of anti-friction rollers. It is, however, a matter of primary importance to the proper working of these rollers and their supported journal that the distance between these rollers as they rotate about their axle shall be uniform, or nearly so, and that at no point in their rotation shall the periphery of one roller touch the periphery of an adjacent roller, as such contact would create the friction we seek to avoid, more especially as two contacting peripheries must inevitably be moving in opposite directions in this series. To prevent this contact I interpose between each two contiguous rollers, D, one or two (preferably two, though of course there may be two or more) spherical separators, E, made of some suitable hard metal. These separators E will be placed in the central part of the rollers D, as is shown in Fig. 7, and it may be here remarked that the length of the rollers D will be equal, or about equal, to that of the journal they are to support.

In order to secure a proper and sufficient size for the separators E the parts of the rollers D against which they operate will be chambered, as in Fig. 7, so as to allow two concentric bands, F and F', to inclose the said rollers, and then within this chambering or sub-diametered part the rollers will be turned down into concave circumferential grooves $d$, within which said grooves the spherical separators will be placed so as to fit snugly but not tightly against the sides of the rollers, thereby keeping the said rollers at uniform distances asunder without permitting them to contact, though leaving them free to turn. These spherical separators will offer much less frictional resistance to the rotation of the rollers than would cylindrical rollers, which have heretofore been used for the purpose, for the reason that in this instance the points of frictional contact are reduced to a minimum.

Each of the rollers D has turned down in its central part, as above stated, a sub-cylinder or chamber, $d'$, as is clearly shown in Fig. 7, so as to allow room for the thickness of the retaining-bands F and F', and the size of these reduced parts of the rollers and the thickness of the said retaining-bands F and F' will be so proportioned as to allow the said bands a little free play without binding on the rollers and the interior of the inner band, F, and the exterior of the outer band, F', will not extend beyond the limits of the periphery-line of the rollers D, so that the interior of the band F will not contact with the journal C, nor the outside of the band F' with the bushing B. Thus the said bands will be allowed to rotate around the axle C without offering any frictional obstruction other than that of retaining the rollers and their separators in their proper relative positions.

The bands F and F' will be made solid, of any suitable metal, and accurately turned up on all sides, so as to fit neatly but not tightly in their places, and turn smoothly around the journal with the rollers D. With these retaining-bands made solid there would be difficulty, if not impossibility, of assembling the parts together when completed, were there no special provision for doing so, and this special provision for assembling the parts I make in the device shown in Fig. 7.

One of the rollers D has one or both of its ends turned down into a small journal spindle or pin, $d^2$, which is passed through a central hole of corresponding size, with a tight fit, in the central ferrule, $d^3$, and the hollow cylindrical end piece, $d^4$, which forms one end of the roller D. It will be easy enough to place all the parts forming this journal-bearing together within the rings F and F', except the last roller, and this can be done by the above-mentioned device, permitting the small pin $d^2$ to be put through between the last two separators, and as it is put in the ferrule $d^3$ is put on, and afterward the cylindrical piece $d^4$. The parts are then all secured together by the pin $d^5$, which will be inserted through the cylindrical piece $d^4$ and its central journal or pin, $d^2$, the said retaining-pin $d^5$ being then inserted and riveted down into a countersink on the side of the piece $d^4$, which will then be smoothed off.

In order to prevent longitudinal play of the axle or journal to an injurious extent, I secure the cap A' to the front end of the box A, and within an annular groove in the said cap-piece I place a spherical bearing-piece, $a'$, against which the thrust of the axle is taken; but as this device is in common use, I lay no claim to invention thereon.

Having described my invention, I claim—

1. The combination, in a journal-bearing, of a series of anti-friction rollers, D, provided with circumferential concave grooves $d$, adapted to receive spherical separators, a series of spherical separators, E, arranged between said rollers and fitting into said grooves, and concentric bands between which the said rollers and separators revolve, substantially as described.

2. The combination, in a journal-bearing, of a series of anti-friction rollers, D, provided with circumferential concave grooves $d$, a series of spherical separators, E, arranged between said rollers and fitting into said grooves, and the solid concentric bands F F', between which the said rollers and separators revolve, substantially as described.

3. The anti-friction rollers D, constructed with a hollow cylindrical end, $d^4$, and a concaved ferrule-piece, $d^3$, combined with a central spindle, $d^2$, so as to assemble the parts between two solid rings, F and F', and leave the last inserted roller practically solid and grooved, the same as the others.

Witnesses:
JAS. HENRY LANGLEY.

O. S. BURR,
HENRY COOKE.